United States Patent [19]

Weaver

[11] 4,342,943

[45] Aug. 3, 1982

[54] $P_2O_5$-$V_2O_5$-PBO GLASS WHICH REDUCES ARCING IN FUNNEL PORTION OF CRT

[75] Inventor: Edward A. Weaver, Toledo, Ohio

[73] Assignee: Owens-Illinois, Inc., Toledo, Ohio

[21] Appl. No.: 85,822

[22] Filed: Oct. 17, 1979

[51] Int. Cl.³ .................. C03C 3/10; H01J 31/00; C03C 3/16; H01B 1/08

[52] U.S. Cl. .................. 313/479; 252/518; 252/506; 501/46; 501/47; 501/49; 501/74; 501/75; 501/20; 501/22; 501/24

[58] Field of Search .............. 106/47 R, 53; 313/450, 313/479; 427/64, 72, 279, 284; 252/518; 501/46

[56] References Cited

U.S. PATENT DOCUMENTS

| | | | |
|---|---|---|---|
| 2,803,783 | 8/1957 | Scott | 315/41 |
| 3,241,009 | 3/1966 | Dewald et al. | 252/518 X |
| 3,278,317 | 10/1966 | Blair et al. | 501/46 |
| 3,393,060 | 7/1968 | Blair et al. | 252/518 UX |
| 3,520,831 | 7/1970 | Trap | 252/518 |
| 3,650,778 | 3/1972 | Dumesnil et al. | 501/46 |
| 4,018,717 | 4/1977 | Francel et al. | 252/518 X |
| 4,040,808 | 8/1977 | Kahn et al. | 252/518 X |
| 4,092,444 | 5/1978 | Kilichowski | 313/479 X |
| 4,124,540 | 11/1978 | Foreman et al. | 252/518 |

FOREIGN PATENT DOCUMENTS 7205938 11/1972 Netherlands .......... 501/46

OTHER PUBLICATIONS

Rawson, H., Inorganic Glass-Forming Systems-Pub. Academic Press, N.Y. (1967) p. 194 FIG. 88.

*Primary Examiner*—Helen M. McCarthy
*Attorney, Agent, or Firm*—David R. Birchall; Myron E. Click; David H. Wilson

[57] ABSTRACT

A glass composition is disclosed that is useful as a solder glass for sealing components together. However, the glass is also especially adapted for use as an electric resistance film for coating the inner neck or funnel portions of a cathode ray tube to reduce arcing. The glass composition includes primarily the oxides of vanadium and phosphorous with the preferred addition of either zinc oxide or lead oxide. Still other metal oxides may be optionally included such as oxides of barium, antimony, lithium, manganese, silicon, boron, molybdenum and mixtures thereof.

6 Claims, No Drawings

$P_2O_5$-$V_2O_5$-PBO GLASS WHICH REDUCES ARCING IN FUNNEL PORTION OF CRT

BACKGROUND OF THE INVENTION

The present invention relates to a solder glass composition, preferably vitreous, adapted to seal various components together, such as sealing a glass surface to another surface including glass, metal, ceramic, and like surfaces. However, the present glass is especially suited for use as a resistive thin film in coating the interior of cathode ray tubes to reduce or suppress arcing.

While glass surfaces may be sealed by applying sufficient heat to adjoining surfaces to cause them to fuse together, the relatively high temperatures which are necessary to achieve fusion create conditions that are detrimental to the glass in that they may also cause deformation as well as permanent stresses which, at a later time, may result in breakage, either spontaneously or when the glass is subjected to physical or thermal shock.

Moreover, fusion sealing is not practical when delicate or sensitive materials are in relatively close proximity to the surfaces being joined, since the high temperatures may adversely affect such materials. One example is in the assembly of a cathode ray tube when a cathodoluminescent surface is deposited on the face plate of the tube and a cathode ray electronic gun is assembled within the funnel portion of the tube. The peripheral edge of the face plate is then placed in juxtaposition with the peripheral edge of the funnel and the edges are sealed together. If the seal is formed by subjecting the adjoining glass surfaces to a temperature sufficient to fuse the glass, such a temperature may adversely affect the cathodoluminescent surface.

To avoid the problems of fusion sealing, soldering galsses are used having a softening point considerably lower than the sealing temperatures of glass surfaces to be united. In this manner the surfaces are safely subjected to a much lower temperature that need be only sufficient to cause the solder glass to soften and flow into the space between the surfaces to form a durable seal between them upon cooling without detrimentally affecting adjoining parts. Preferably, the solder glass has a softening point which is comfortably within the temperature range in which other components of a product, such as a cathode ray tube, are assembled and fixed in position.

Another problem peculiar to cathode ray tubes is arcing within the tube. Arcing occurs in the electron gun area of a cathode ray tube and can damage both the electron gun and the electronic circuitry which is responsible for the operation of the gun. The problem becomes potentially more serious in view of the trend toward the use of higher operating potentials, up to 30 kv, to enhance the brightness of the picture. Contaminants within a cathode ray tube and especially particulate contaminants can cause arcing. For example, in one practice a highly conductive graphite film is deposited on the tube funnel. If the film does not have adequate scratch resistance and adhesion characteristics, particles of the film may break loose, contaminate the tube, and introduce arcing. Further, contamination can also occur from normal manufacturing procedures and from normal use.

It has been proposed to apply a resistive thin film on the inside of a cathode ray tube. U.S. Pat. No. 3,355,617 to Schwartz et al forms such a film comprised of iron and manganese oxide.

U.S. Pat. No. 4,092,444 to Killichowski discloses depositing a resistive thin film on internal surfaces of a cathode ray tube by pyrolysis of a liquid mixture of colloidal graphite and a heavy metal resinate to produce a film which is a mixture of graphite and the oxide of the metal. The metal resinate is a combination of tin and antimony resinate.

For purposes of normal solder glass, it is usually preferable for the glass to be controllably devitrified or crystallized. Devitrifiable solder glasses do not have the capability of re-softening at their original softening points after they have once devitrified and the parts tend to stay in place because of little vitreous flow. A devitrified solder glass also forms a stronger seal than a vitreous one. However, in the resistive films it has been found that vitreous films are preferable to crystalline ones because devitrification is not needed and hard to control when present. For instance very rapid devitrification produces poor flow and poor adherence.

SUMMARY OF THE INVENTION

An object of the present invention is to provide an improved solder glass composition for sealing glasses to other surfaces. Another object is to provide a glass especially adapted for performing an electric resistive film on the interior of a cathode ray tube.

The present glasses are primarily ternary systems including the oxides of vanadium and phosphorous and a further metal oxide which may be either zinc oxide or lead oxide.

The glass composition may comprise in weight percent approximately:

| | |
|---|---|
| Vanadium Oxide | 45% to 80% |
| Phosphorous Oxide | 5% to 50% |
| Metal Oxide | 0% to 25% | in which the metal oxide is zinc oxide or lead oxide.

Although the glass compositions comprise primarily ternary systems as indicated, other components may be present or tolerated. For example, mixtures of zinc oxide and lead oxide within the range up to 25% by weight may be used as the basic third ingredient to the oxides of the vanadium and phosphorous. Or still other additional metal oxides may be present in amounts insufficient to affect the desirable properties of the glasses materially or adversely. Such other metal oxides may include the oxides of barium, antimony, lithium, manganese, silicon, boron, molybdenum, and mixtures thereof.

Glasses of the present invention have a softening point no higher than about 475° C. and an electrical resistance within the range of about 100,000 ohms to about 100 megohms per square.

The glass may be used in the usual manner of solder glasses but finds most useful application of an electric resistive thin film in coating interior surfaces of a cathode ray tube, such as the neck or funnel portions of the tube.

DESCRIPTION OF THE PREFERRED EMBODIMENTS

Compositions illustrating the present glasses, their preparation and use, are described, followed by specific examples of glass compositions and their pertinent physical properties.

Glasses of the invention have a general composition comprising in weight percent approximately:

| | |
|---|---|
| Vanadium Oxide | 45% to 80% |
| Phosphorous Oxide | 5% to 50% |
| Metal Oxide | 0% to 25% | in which the metal oxide is zinc oxide, lead oxide, or mixtures thereof. Zinc oxide is preferred.

A more desirable range comprises in weight percent approximately:

| | |
|---|---|
| $V_2O_5$ | 50% to 75% |
| $P_2O_5$ | 15% to 40% |
| Metal Oxide | 5% to 20% | in which the metal oxide again is zinc oxide, lead oxide, or mixtures thereof.

While the instant glasses are, accordingly, substantially ternary systems, still other components may be present either as additives to vary the glass properties or as impurities introduced from the principal components or from still other sources. The composition of such other components is not at all critical as long as they, in combination with their percentage content, do not materially or significantly adversely affect the desired properties of the resulting glasses. For instance, small proportions of the usual colorant oxides are generally harmless.

Other oxides which may be added to vary the glass properties or which may be present from other sources include the oxides of barium, antimony, lithium, manganese, silicon, boron, molybdenum, and mixtures thereof. As a rule, such additional components may be present in amounts from 0% up to about 15% by weight of the glass.

For example, boron oxide and molybdenum oxide improve the flow properties of the fused glass. Barium oxide, boron oxide, and silica tend to stabilize the glass. Barium oxide also retards crystallization. Lithium oxide and antimony oxide adjust the electrical resistivity of the glass.

A preferred glass composition of the present invention comprises in weight percent approximately:

| | |
|---|---|
| $V_2O_5$ | 68% to 76% |
| $P_2O_5$ | 15% to 22% |
| ZnO | 2% to 12% |
| BaO | 0% to 6% |

The glasses are conventionally melted, quenched and ground to particle size. More particularly, the indicated oxides, or compounds which convert to such oxides under heat, are mixed as a batch. The best mode is to use reagent grade $V_2O_5$, ZnO, $Pb_3O_4$ and 85% phosphoric acid. Batches can be prepared by adding the acid to the premixed powders and then allowing the mixture to stand for a time to react the acid thoroughly with the oxides. This produces a batch which handles more like a conventional dry glass batch. The batches may be melted, for example at about 1100° C. for 10 to 20 minutes, and then quenched into thin chips between steel plates. The chips are conventionally ground into powder, for instance, to a particle size passing 200 to 325 mesh U.S. Standard sieve.

The present glass compositions can be used as sealing glasses for assembling preformed parts. More particularly, the glasses can be used for effecting seals between such parts as glass-to-glass, glass-to-metal, and the like. The sealing or solder glasses can be applied by both conventional hot or cold techniques. In one technique, glass particles are mixed with a suitable carrier or vehicle to form a paste-like mixture. One vehicle which may be used comprises from about one to three weight percent of nitrocellulose in amyl acetate. Other organic binders and vehicles may be employed as known in the art, provided they readily burn off or volatilize during the heating of the sealing process.

The glass particle-vehicle paste may be applied by known techniques such as by a spatula, brush, doctor blade, and the like. The sealing glass may also be used in bead form and the sealing effected by a gas-oxygen flame or the like. Alternatively, at least one of the surfaces of the parts to be sealed can be coated with sealing glass particles, the parts assembled, dried and sealed in an oven, and finally cooled to room temperature.

In the more usual soldering or sealing operation, a slurry of the glass particles in an organic vehicle is brushed onto one or both of the surfaces of the parts to be sealed. The parts are then placed in contact with each other and subjected to a temperature above the softening point of the sealing glass, causing it to flow and wet the surfaces while volatilizing the vehicle. Since this temperature is below that which is damaging to the surfaces being sealed, there is no distortion or deformation of the surfaces; nor is there any collapse of a glass article, such as a glass envelope, being sealed. The sealing temperature is maintained for a sufficient period of time to complete the softening and flow of the solder glass and accomplish the desired seal. The sealed surfaces are then cooled to ambient temperatures.

Referring specifically to coating the internal surfaces of a cathode ray tube, the present glasses make excellent resistive, semi-conductive films which conduct or drain a current or charge away from the phosphor area of a face plate of a cathode ray tube. The films also suppress arcing. More particularly, a paste of the present glass particles in an organic vehicle is brushed onto inner surfaces of a cathode ray tube, especially the neck and funnel portions. The tube is then heated to evaporate the vehicle of the paste and fuse the glass particles into a relatively thin electrically resistant film. The heating may be carried out at about 400° C. to about 475° C. for about 45 minutes to about five hours. The thickness of the film is not critical and may range, for example, from about 0.25 mil to about 3 mils.

The present glasses have physical properties which well adapt them for the purposes indicated. For example, the glasses have a softening temperature no higher than about 475° C., and many of the indicated compositions have a softening temperature no higher than about 450° C. Films of the glasses have electrical resistivities necessary for limiting current or suppressing arcing within the glass envelope of a cathode ray tube. As expressed here and in the claims, the electric resistivity value given is that for a film of the glass which has a thickness of one mil and which has been fired at 440° C. for 45 minutes. Glasses of the present compositions may have electrical resistivities under this test ranging from about 100,000 ohms to about 100 megohms per square. More usually and preferably the electrical resistivity is within the range of about 0.5 to 5 megohms per square with a preferred resistivity of about one megohm per square. Resistance is substantially inversely proportional to film thickness if bulk resistance is measured as contrasted with surface resistance where resistance is proportional to the path length.

Desirably, the resistivity is not so high as to leave the film non-conducting. A semi-conducting film facilitates a drain of any charge build-up which is another way of suppressing arcing.

While some compositions of the present glasses do devitrify and may be used in a completely devitrified form, many of the compositions do not devitrify and are vitreous or amorphous at ambient temperatures. In general, the vitreous state is preferred for resistive films to enable good flow and adherence of the film with respect to a substrate. Also, if a sealing glass does not tend to devitrify, the time within which the glass can be kept fluid at the sealing temperature can be as long as needed and the operation need not be accelerated for fear of devitrification of the glass. This is an important consideration in the process of sealing cathode ray tubes in which temperature differences across the tube may exist during the sealing process. If the time allowed for sealing is too short, part of the bulb may have the sealing glass undergo devitrification, while another part of the bulb may have the sealing glass still in a glassy or vitreous state. When a glass has a tendency to devitrify, it is possible to have the glass crystallized before it has had an opportunity to flow completely and thoroughly wet the surfaces to be sealed.

Devitrification and therefore crystallization can also make the glass more electroconducting than it might otherwise be. Electroconductivity is also increased by increasing the concentration of trivalent vanadium at the expense of pentavalent vanadium, since there is electronic conductivity between the two metal ions.

Another distinguishing property of the present glasses is that they can be substantially water soluble due to the presence of both vanadium and phosphorous. Those glasses containing zinc oxide are more water soluble than those containing lead oxide. In one instance, a chip of the present glass containing zinc oxide was completely dissolved or disintegrated in boiling water in less than 45 minutes. Water turned dark green almost immediately after five grams of the chip sample were added to 100 grams of water. In another instance, a chip of a present glass containing lead oxide lost only about 4% of its weight under similar conditions.

A common practice in the fabrication of a cathode ray tube is to coat neck or funnel portions with suspension of colloidal graphite in water to deposit a conductive film. Such a suspension is sold under the trademark "Aquadag". Not all after-applied materials are compatible with the graphite film, but resistive films of the present glasses can be used to cover selected parts of the graphite film as may be desirable with little or no subsequent separation or peeling problems. The preferred order is to apply the graphitic carbon layer first and then apply the glass resistive film. While for a given composition the resistance of the present glasses is substantially the same whether they contain zinc oxide or lead oxide, there is a tendency for the graphitic film to reduce the lead oxide to lead and oxides of carbon. This does not occur with the glasses containing zinc oxide and is another reason for preferring glasses of the present system containing that oxide in lieu of lead oxide.

Glasses of the invention also have excellent adherence to substrates and flow properties as illustrated by data of the following examples. Flow tests were conducted by first forming glass chips from a smelted batch as previously described. The chips were ground to pass 200 mesh U. S. Standard sieve, and the resulting powder along with a small amount of amyl acetate and nitrocellulose as a binder was pressed into pills measuring 0.110 inch in diameter and 0.110 in height. The pills were then heated at various times and temperatures unsupported, and the resultant ratio at the end of the test of the width to the height was used as a measure of flow. A flow ratio of three for a particular time and temperature is considered to be quite good. As used in the claims, the term "flow ratio" is a ratio obtained by heating a described pill at 400° C. for 30 minutes.

The following examples only illustrate the invention and should not be construed as imposing limitations on the claims. Percentages are by weight unless otherwise indicated. The resistances given in the tables were obtained after heating the subject films at 440° C. for 45 minutes.

EXAMPLES 1 THROUGH 19

Table A exemplifies 19 different glass compositions of the present invention. The resistant values are given in megohms per square, and the relative glassiness of the resulting films from the compositions are indicated.

TABLE A

GLASS COMPOSITIONS AND PROPERTIES
(Percentages By Weight)

| Example | $V_2O_5$ | ZnO | $P_2O_5$ | $SiO_2$ | $B_2O_3$ | BaO | Resistance MΩ/Sq. | Glassy Nature |
|---|---|---|---|---|---|---|---|---|
| 1 | 70 | 10 | 20 | — | — | — | 6.0 | glassy |
| 2 | 73 | 5 | 19 | 1 | 2 | — | 10.0 | glassy |
| 3 | 74 | 5 | 18 | 1 | 2 | — | 5.0 | glassy |
| 4 | 75 | 4 | 17 | 1 | 2 | 1 | 0.5 | matt, soft |
| 5 | 75 | 4 | 17 | 1 | 1 | 2 | 0.07 | matt, soft |
| 6 | 74 | 5 | 18 | 1 | 1 | 1 | 0.3 | semi-glassy |
| 7 | 75 | 5 | 17 | 1 | 2 | — | 1.0 | matt |
| 8 | 75 | 7 | 18 | — | — | — | 0.8 | glassy |
| 9 | 75 | 23 | 2 | — | — | — | 4.4 | semi-glassy |
| 10 | 73 | 5 | 20 | — | — | 2 | 5.5 | glassy |
| 11 | 73 | 3 | 20 | — | — | 4 | 7.0 | glassy |
| 12 | 73 | 1 | 20 | — | — | 6 | 3.7 | glassy |
| 13 | 70 | 6.67 | 17.05 | — | — | 6.28 | 0.02 | matt |
| 14 | 71 | 6.00 | 17.35 | — | — | 5.65 | 0.04 | matt |
| 15 | 72 | 5.33 | 17.65 | — | — | 5.02 | 0.03 | matt |
| 16 | 73 | 4.67 | 17.93 | — | — | 4.40 | 2M | glassy |
| 17 | 74 | 4.00 | 18.23 | — | — | 3.77 | 0.5 | glassy |
| 18 | 75 | 3.33 | 18.53 | — | — | 3.14 | 0.2 | glassy |

TABLE A-continued
GLASS COMPOSITIONS AND PROPERTIES
(Percentages By Weight)

| Example | $V_2O_5$ | ZnO | $P_2O_5$ | $SiO_2$ | $B_2O_3$ | BaO | Resistance M$\Omega$/Sq. | Glassy Nature |
|---|---|---|---|---|---|---|---|---|
| 19 | 74 | 2.15 | 19.25 | — | — | 4.60 | 0.85 | glassy |

The resistance of a given composition can be influenced by the particle size distribution of the powdered glass.

EXAMPLES 20 THROUGH 34

Table B lists 15 additional glass compositions. These compositions have softening temperatures no higher than 450° C. The densities are in grams per cubic centimeter.

TABLE B
LOW TEMPERATURE SEALING GLASSES
(Percentages By Weight)

| Example | $V_2O_5$ | PbO | ZnO | $P_2O_5$ | $Sb_2O_3$ | $B_2O_3$ | $MoO_3$ | Density |
|---|---|---|---|---|---|---|---|---|
| 20 | 70 | 10 | — | 20 | — | — | — | — |
| 21 | 65 | 10 | — | 20 | 5 | — | — | — |
| 22 | 70 | — | 5 | 25 | — | — | — | — |
| 23 | 65 | — | 10 | 25 | — | — | — | — |
| 24 | 75 | — | 2 | 23 | — | — | — | — |
| 25 | 75 | — | — | 25 | — | — | — | — |
| 26 | 75 | 5 | — | 20 | — | — | — | — |
| 27 | 70 | 5 | — | 25 | — | — | — | — |
| 28 | 65 | 10 | — | 25 | — | — | — | — |
| 29 | 65 | 15 | — | 20 | — | — | — | — |
| 30 | 72.5 | — | 3.5 | 24 | — | — | — | — |
| 31 | 70 | — | 5 | 25 | — | 1 | — | 2.95 |
| 32 | 65 | 15 | — | 20 | — | 1 | — | 3.23 |
| 33 | 70 | — | 5 | 25 | — | — | 2 | 3.11 |
| 34 | 65 | 15 | — | 20 | — | — | 2 | 3.28 |

A flow ratio is a function of temperaure and time.

When a pill of the composition of Example 22 was heated at a sealing temperature of 380° C. for 30 minutes, it had a flow ratio of 1.425. But when a pill of the same composition as Example 22 was heated at a sealing temperature of 400° C. for 30 minutes, it had a flow ratio of 3.309. Similarly, when the composition of Example 23 was heated at a sealing temperature of 380° C., it had a flow ratio of 1.778. But when a pill of the same composition of Example 23 was heated at a sealing temperature of 400° C., it had a flow ratio of 3.182.

EXAMPLES 35 THROUGH 44

Table C provides flow ratios and melting contact angles of glass compositions of the present invention. The higher contact angles indicate better wetting or coverage of the glass. A flow ratio of at least three can be obtained with many glasses of the invention at relatively low temperatures with sealing times of three to five hours, or by sealing at 400° C. for 30 minutes. However, for a standard of comparison, the term "flow ratio" as used in the claims is a ratio obtained by heating a pill at 400° C. for 30 minutes.

TABLE C
GLASS FLOW RATIOS

| Example | w/h 380° C. 45 min. | w/h 380° C. 16 hours | $\phi$ 380° C. 45 min. | $\phi$ 380° C. 45 hours |
|---|---|---|---|---|
| 35 | 1.71 | 3.2 | 95 | 115 |
| 36 | 1.40 | 5.3 | <90 | 140 |
| 37 | 1.12 | 3.8 | <90 | 120 |
| 38 | 1.52 | 3.33 | <90 | 135 |
| 39 | 1.08 | 1.7 | 90* | 90* |
| 40 | 2.07 | 3.66 | 100* | 120 |
| 41 | 1.05 | 2.5 | 90* | 115 |
| 42 | 1.48 | 5.4 | <90 | 140 |
| 43 | 1.33 | 1.43 | <90 | <90 |
| 44 | 1.31 | 1.32 | <90 | <90 | w/h = flow ratio
$\phi$ = melting angle
* = approximate

EXAMPLES 45 THROUGH 51

Table D illustrates still further glass compositions falling within the present invention. The compositions of Examples 45 and 46 include lithium oxide and antimony oxide, respectively. The resistant values were determined on films measuring about two mills in thickness and fired at 440° C. for 45 minutes.

TABLE D
RESISTIVE COMPOSITIONS AND PROPERTIES
(Percentages By Weight)

| Example | $V_2O_5$ | ZnO | PbO | $P_2O_5$ | $Li_2O$ | $Sb_2O_3$ | Film Resistance Per Square | Description of Film |
|---|---|---|---|---|---|---|---|---|
| 45 | 70 | 14.5 | — | 15 | 0.5 | — | 32M | lightly sintered |
| 46 | 60 | 15.0 | — | 20 | — | 5 | 150k | semi-gloss |
| 47 | 75 | 5.0 | — | 20 | — | — | 1.3M | hard and glossy |
| 48 | 70 | 15.0 | — | 15 | — | — | 6M | lightly sintered |
| 49 | 70 | — | 10 | 20 | — | — | 4.4M | semi-gloss or matt |
| 50 | 65 | — | 15 | 20 | — | — | 24M | hard and glossy |
| 51 | 75 | — | 10 | 15 | — | — | 60K | hard and glossy |

EXAMPLES 52 THROUGH 77

Table E discloses additional examples of the present glass compositions and introduces an evaluation of adherence of a film of the glass to another control glass, such as that used to fabricate the envelope of a cathode ray tube. Table E concerns glasses containing zinc oxide. The adherence value was determined according to an arbitrarily established scale, namely, a scale of one to five as follows:

TABLE E

RESISTIVE FILM COMPOSITIONS
($V_2O_5$—ZnO—$P_2O_5$)
(Percentages By Weight)

| Example | $V_2O_5$ | ZnO | $P_2O_5$ | $Sb_2O_3$ | Adherence | Resistance/Square |
|---|---|---|---|---|---|---|
| 52 | 75 | 12.5 | 12.5 | — | 1 | 100k |
| 53* | 70 | 14.5 | 15.0 | — | 5 | 300k |
| 54* | 75 | 12.0 | 12.5 | — | 3 | 240k |
| 55 | 70 | 12.5 | 12.5 | 5 | 4 | 220k |
| 56 | 65 | 15.0 | 20.0 | — | 4 | 7M |
| 57 | 60 | 15.0 | 20.0 | 5 | 5 | 300k |
| 58 | 70 | 5.0 | 25.0 | — | 5 | 11.8M |
| 59 | 70 | 10.0 | 20.0 | — | 5 | 1.1M |
| 60 | 70 | 15.0 | 15.0 | — | 1 | 550k |
| 61 | 70 | 20.0 | 10.0 | — | 1 | 5M |
| 62 | 65 | 10.0 | 25.0 | — | 5 | 42M |
| 63 | 69 | 10.0 | 20.0 | 1 | 5 | 890k |
| 64 | 75 | 10.0 | 15.0 | — | 1 | 400k |
| 65 | 75 | 5.0 | 20.0 | — | 5 | 600k |
| 66 | 75 | 2.0 | 23.0 | — | 5 | 2.1M |
| 67 | 75 | 0 | 25.0 | — | 5 | 3.6M |
| 68 | 50 | 5.0 | 45.0 | — | 1 | 45M |
| 69 | 55 | 5.0 | 40.0 | — | 2 | 70M |
| 70 | 60 | 5.0 | 35.0 | — | 3 | 75M |
| 71 | 65 | 5.0 | 30.0 | — | 4 | 40M |

*Also contained 0.5% $Li_2O$

Adherence Legend:
1. No sintering, no adherence
2. Light sintering, no adherence
3. Medium sintering, light adherence
4. Medium flow, good adherence
5. Good flow, good adherence Many of these compositions have an adherence rating of five and electrical resistance within the range of 190,000 ohms to 11.8 megohms. These properties especially adapt the glasses for use as resistive films for coating the inner surfaces of cathode ray tubes.

Table F is similar to Table E except that the glasses contain lead oxide instead of zinc oxide.

TABLE F

RESISTIVE FILM COMPOSITIONS
($V_2O_5$—PbO—$P_2O_5$)
(Percentages By Weight)

| Example | $V_2O_5$ | PbO | $P_2O_5$ | $Sb_2O_3$ | Adherence | Resistance/Square |
|---|---|---|---|---|---|---|
| 72 | 80 | 10 | 10 | — | 1-2 | 5M |
| 73 | 75 | 10 | 10 | 5 | 2-3 | 75k |
| 74 | 70 | 10 | 20 | — | 5 | 190k |
| 75 | 65 | 10 | 20 | 5 | 5 | 23M |
| 76 | 60 | 10 | 30 | — | — | — |
| 77 | 55 | 10 | 30 | 5 | — | — |

Although the foregoing discloses several embodiments of the present invention, it is understood that the invention may be practiced in still other forms within the scope of the following claims.

I claim:

1. In a cathode ray tube having a neck portion and a funnel portion, an electrically resistant film coating at least one of said portions within the tube adapted to reduce arcing, said film being a glass consisting essentially in weight percent of approximately:

| | |
|---|---|
| Vanadium Oxide | 50% to 75% |
| Phosphorous Oxide | 15% to 40% |
| Lead Oxide | 5% to 20% | in which said glass composition has a softening point no higher than about 475° C., and an electrical resistance within the range of about 100,000 ohms to about 100 megohms per square.

2. The cathode ray tube of claim 1 in which said glass composition contains an additive oxide from 0% to about 15% by weight, said additive oxide being an oxide of barium, antimony, lithium, manganese, silicon, boron, molybdenum, and mixtures thereof.

3. The cathode ray tube of claim 1 in which said glass is substantially completely vitreous.

4. The cathode ray tube of claim 1 in which said glass has a flow ratio of at least 3.

5. The cathode ray tube of claim 1 in which at least one of said portions contains a graphitic film to which said glass film is applied.

6. The cathode ray tube of claim 1 in which said glass is substantially water-soluble.

* * * * *